(12) United States Patent
Yasuda et al.

(10) Patent No.: US 11,886,996 B2
(45) Date of Patent: Jan. 30, 2024

(54) TRAINING DATA EXTENSION APPARATUS, TRAINING DATA EXTENSION METHOD, AND PROGRAM

(71) Applicant: NIPPON TELEGRAPH AND TELEPHONE CORPORATION, Tokyo (JP)

(72) Inventors: Masahiro Yasuda, Tokyo (JP); Yuma Koizumi, Tokyo (JP); Noboru Harada, Tokyo (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 128 days.

(21) Appl. No.: 17/619,593

(22) PCT Filed: Jun. 20, 2019

(86) PCT No.: PCT/JP2019/024422
§ 371 (c)(1),
(2) Date: Dec. 16, 2021

(87) PCT Pub. No.: WO2020/255318
PCT Pub. Date: Dec. 24, 2020

(65) Prior Publication Data
US 2022/0383106 A1    Dec. 1, 2022

(51) Int. Cl.
*H04S 1/00* (2006.01)
*H04S 7/00* (2006.01)
*G06N 3/08* (2023.01)

(52) U.S. Cl.
CPC .............. *G06N 3/08* (2013.01); *H04S 1/007* (2013.01); *H04S 7/30* (2013.01); *H04S 2400/11* (2013.01); *H04S 2400/15* (2013.01); *H04S 2420/11* (2013.01)

(58) Field of Classification Search
CPC ........ H04S 1/007; H04S 7/30; H04S 2400/11; H04S 2400/15
See application file for complete search history.

(56) References Cited

U.S. PATENT DOCUMENTS

2018/0192226 A1* 7/2018 Woelfl .................. H04R 5/033

FOREIGN PATENT DOCUMENTS

JP    2008060635 A  *  3/2008
JP    2011176535 A  *  9/2011

OTHER PUBLICATIONS

Salamon et al.; "Deep Convolution Neural Networks and Data Augmentation for Environment Sound Classification"; IEEE Signal Processing Letters; Nov. 2016 (Year: 2016).*
Adavanne et al. (2019) "Sound event localization and detection of overlapping sources using convolutional recurrent neural networks," IEEE Journal of Selected Topics in Signal Processing, vol. 13-1, pp. 34-48.

(Continued)

*Primary Examiner* — David L Ton (57) ABSTRACT

An input of a first observation signal corresponding to an incoming signal from a first direction is received, an angular rotation operation of the first observation signal is performed to obtain a second observation signal corresponding to an incoming signal from a second direction that is different from the first direction and the second observation signal is added to a set of training data.

8 Claims, 4 Drawing Sheets

(56) References Cited

OTHER PUBLICATIONS

Inoue et al. (2018) "Domestic Activities Classification Based on CNN Using Shuffling and Mixing Data Augmentation," Tech. Report of DCASE 2018 task 5.
Lasseck (2018) "Acoustic Bird Detection With Deep Convolutional Neural Networks," Tech. Report of DCASE 2018 task 5.

* cited by examiner

TRAINING DATA EXTENSION APPARATUS, TRAINING DATA EXTENSION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2019/024422, filed on 20 Jun. 2019, the disclosure of which is hereby incorporated herein by reference in its entirety.

TECHNICAL FIELD

The present invention relates to a training data augmentation technique.

BACKGROUND ART

There is a technical field in which from an acoustic signal observed by a microphone, a "type of the acoustic signal," a "time of the acoustic signal," a "direction of arrival of the acoustic signal (direction of a sound source)" are estimated (technical field in which, for example, what kind of sound has been produced and when (a start time and an end time) and from which direction the sound has been produced are estimated) (see, for example, Non-Patent Literature 1).

Such a technical field has a problem in that collection of sufficient training data is difficult. In general, where training data is insufficient in machine learning, a technique called "data augmentation" is used (see, for example, Non-Patent Literatures 2 and 3). In this technique, the number of training data is increased by generating other new training data from training data.

CITATION LIST

Non-Patent Literature

Non-Patent Literature 1: S. Adavanne, A. Politis, J. Nikunen, and T. Virtanen, "Sound event localization and detection of overlapping sources using convolutional recurrent neural networks," IEEE Journal of Selected Topics in Signal Processing, Vol. 13-1, pp. 34-48, 2019.

Non-Patent Literature 2: T. Inoue, P. Vinayavekhin, S. Wang, D. Wood, N. Greco and R. Tachibana, "Domestic Activities Classification Based on CNN Using Shuffling and Mixing Data Augmentation," Tech. Report of DCASE 2018 task 5, 2018.

Non-Patent Literature 3: M. Lasseck, "ACOUSTIC BIRD DETECTION WITH DEEP CONVOLUTIONAL NEURAL NETWORKS," Tech. Report of DCASE 2018 task 5, 2018.

SUMMARY OF THE INVENTION

Technical Problem

However, conventional data augmentation techniques have a problem in that when other new training data is generated from training data, transfer characteristics of the original training data are destroyed. Therefore, the conventional data augmentation techniques cannot be applied to models that perform estimation of a direction of arrival of an acoustic signal. This problem is common to cases where a direction of arrival of an acoustic signal is estimated and cases where a direction of arrival of any of other signals is estimated. Also, the problem is also common to cases where a direction of arrival of a signal is estimated without estimation of a "type of the acoustic signal" and a "time of the acoustic signal."

The present invention has been made in view of such points as above and an object of the present invention is to increase the number of training data usable for a model for estimation of a direction of arrival of a signal to learn.

Means for Solving the Problem

An input of a first observation signal corresponding to an incoming signal from a first direction is received, an angular rotation operation of the first observation signal is performed to obtain a second observation signal corresponding to an incoming signal from a second direction that is different from a first direction, and the second observation signal is added to a set of training data.

Effects of the Invention

The present invention enables an increase in number of training data usable for a model for estimation of a direction of arrival of a signal to learn.

DESCRIPTION OF EMBODIMENTS

Embodiments of the present invention will be described below with reference to the drawings.

[Principle]

First, a principle will be described.

As an example, a case where, based on signals obtained through observation by a plurality of microphones, a "type of an acoustic signal," a "time of generation of the acoustic signal" and a "direction (an azimuth angle and an elevation angle) of arrival of the acoustic signal" are estimated will be described. However, this is not intended to limit the present invention. As an example, it is assumed that an acoustic signal is observed by M microphones. M is an integer of no less than 2. A complex spectrogram obtained by conversion of a signal observed by an m-th ($m \in \{1, \ldots, M\}$) microphone into a time-frequency domain is expressed as $D^{(m)} \in C^{F \times \tau}$. An example of the conversion into a time-frequency domain is short-time Fourier transform (STFT). Here, C is a complex number, F is the number of frequency indices (number of discrete frequencies), $\tau$ is the number of time indices (number of discrete times), and $C^{F \times \tau}$ is a set of $F \times \tau$ complex numbers. A discrete frequency of a frequency index $f \in \{1, \ldots, F\}$ is expressed as a "frequency f" and a discrete frequency of a time index $t \in \{1, \ldots, \tau\}$ is expressed as a "time t." Also, a tensor of $D^{(1)}, \ldots, D^{(M)}$ corresponding to an acoustic signal observed by the M, that is, first to M-th microphones is expressed as follows.

$$D \in \{D^{(m)}\}_{m=1}^{M}$$

Also, a variable that if a c-th class sound source produces sound at a time t, is 1 and if not, 0 is expressed as $p_{c,t} \in \{0, 1\}$. Respective variables representing an azimuth angle and an elevation angle of the c-th class sound source existing at the time t are expressed as $a_{c,t}$ and $e_{c,t}$. Then, the aforementioned problem of estimating a "type of an acoustic signal," a "time of generation of the acoustic signal" and a "direction of arrival of the acoustic signal" based on signals obtained through observation by a plurality of microphones can be formulated as a problem of estimating a function for estimating, from D,
a matrix including $p_{c,t}$ as an element $$P \in N_{\{0,1\}}^{C \times \tau},$$

a matrix including $a_{c,t}$ as an element $$A \in R_{[-\pi,\pi)}^{C \times \tau},$$

and
a matrix including $e_{c,t}$ as an element $$E \in R_{[-\pi/2,\pi/2)}^{C \times \tau}$$

Here, [α, β) represents a range of no less than α but less than β. N is a set of natural numbers and R is a set of real numbers. This problem is a problem of learning a parameter a of a function $M_\alpha$ in $$\hat{P}, \hat{A}, \hat{E} \leftarrow M_\alpha(D).$$

Here, $$\hat{P}, \hat{A}, \hat{E}$$

are estimation matrices for P, A and E, respectively. Estimation of P is referred to as "acoustic event detection" and estimation of A and E are referred to as "estimation of a sound source direction (estimation of a direction of arrival of an acoustic signal)." For example, in each of Non-Patent Literature 3 and Reference Literature 1, an estimation method in which the function $M_\alpha$ is a neural network has been proposed.

Reference Literature 1: Y. Cao, Q. Kong, T. Iqbal, F. An, W. Wang, and M. D. Plumbley "Polyphonic Sound Event Detection and Localization using a Two-Stage Strategy," arXiv preprint, arXiv: 1905. 00268, 2019.

In particular, in Reference Literature 1, acoustic event detection and sound source direction estimation are performed based on different networks (functions) $S_{\sigma_S}$, $D_{\sigma_D}$ as follows.

$$\hat{P} \leftarrow S_{\sigma_S}(D)$$

$$\hat{A}, \hat{E} \leftarrow D_{\sigma_D}(D)$$

Then, a parameter $\sigma_S$ in $S_{\sigma_S}$ is learned in such a manner as to minimize binary cross-entropy and $D_{\sigma_D}$ is learned in such a manner as to minimize a mean absolute error between A and A^ and a mean absolute error between E and E^ in a zone in which the sound source exists. The superscript "^" in "A^" and "E^" should be indicated just above "A" and "E" properly, but is indicated to the upper right of "A" and "E" because of limitations on notation of characters.

In the case of this problem, there are three types of estimation variables, and thus, for example, if $M_\alpha$ is implemented by a neural network, a multi-layer convolutional neural network or a recurrent neural network is necessary. Where such a complicated neural network is used, a massive amount of training data is necessary. In order to artificially increase a training data amount (data augmentation), in the field of acoustic event detection, the data augmentation techniques stated in, e.g., Non-Patent Literatures 2 and 3 are used. However, as stated above, the conventional data augmentation techniques have a problem in that when other new training data is generated from training data, transfer characteristics of the original training data are destroyed. Therefore, the conventional data augmentation techniques cannot be applied to models that perform estimation of a direction of arrival of an acoustic signal.

Accordingly, in order to increase the number of training data, a new data augmentation technique will be proposed. In the new data augmentation technique, in order to increase the number of training data without destruction of transfer characteristics, an input of a first observation signal corresponding to an incoming signal from a first direction is received, an angular rotation operation of the first observation signal is performed to obtain a second observation signal corresponding to an incoming signal from a second direction that is different from the first direction and the second observation signal is added to a set of training data. Consequently, it is possible to increase the number of training data without destruction of transfer characteristics.

Here, for simplicity of description, an example using a first observation signal based on a first-order Ambisonics (FOA) signal (hereinafter, an "FOA signal") observed by first-order Ambisonics will be described. However, this example is not intended to limit the present invention. Ambisonics is described in, e.g., Reference Literature 2.

Reference Literature 2: Ryouichi Nishimura, "5. Ambisonics," The journal of the Institute of Image Information and Television Engineers, Vol. 68, No. 8, pp. 616-620, August, 2014.

In first-order Ambisonics, an acoustic signal is observed using a special microphone called an "ambisonic microphone." An ambisonic microphone includes an omnidirectional microphone (sensor), a microphone having directivity in a direction of an X-axis, a microphone having directivity in a direction of a Y-axis and a microphone having directivity in a direction of a Z-axis. The X-axis, the Y-axis and the Z-axis are coordinate axes of a Cartesian coordinate system. For example, the X-axis is a vertical axis, the Y-axis is a right-and-left axis and the Z-axis is a front-and-rear axis. An FOA signal converted into a B-format includes elements that are a W component $D^{(W)}$ based on a signal observed by the omnidirectional microphone, an X component $D^{(X)}$ based on a signal observed by the microphone having directivity in the direction of the X-axis, a Y component $D^{(Y)}$ based on a signal observed by the microphone having directivity in the direction of the Y-axis and a Z component $D^{(Z)}$ based on a signal observed by the microphone having directivity in the direction of the Z-axis. Spatial frequency responses of the FOA signal converted into a B-format are expressed as follows.

$$H_1(a_{c,t}, e_{c,t}, f) = 1$$

$$H_2(a_{c,t}, e_{c,t}, f) = \sqrt{3} * \sin(a_{c,t}) * \cos(e_{c,t})$$

$$H_3(a_{c,t}, e_{c,t}, f) = \sqrt{3} * \sin(e_{c,t})$$

$$H_4(a_{c,t}, e_{c,t}, f) = \sqrt{3} * \cos(a_{c,t}) * \cos(e_{c,t})$$

Here, "*" represents multiplication, and $H_1(a_{c,t}, e_{c,t}, f)$, $H_2(a_{c,t}, e_{c,t}, f)$, $H_3(a_{c,t}, e_{c,t}, f)$ and $H_4(a_{c,t}, e_{c,t}, f)$ are spatial frequency responses for the W component $D^{(W)}$, the Y component $D^{(Y)}$, the Z component $D^{(Z)}$ and the X component $D^{(X)}$, respectively (see, for example, Reference Literature 3).

Reference Literature 3: S. Adavanne, A. Politis, and T. Virtanen, "A multi-room reverberant dataset for sound event localization and uetection," in Submitted to Detection and Classification of Acoustic Scenes and Events 2019 Workshop (DCASE2019). 2019.

Now, a transfer function vector $H_{c,\,t}$ including, as elements, $H_1(a_{c,\,t},\,e_{c,\,t},\,f)$, $H_2(a_{c,\,t},\,e_{c,\,t},\,f)$, $H_3(a_{c,\,t},\,e_{c,\,t},\,f)$, $H_4(a_{c,\,t},\,e_{c,\,t},\,f)$ is expressed with f omitted as follows.

$$H_{c,t} = \begin{bmatrix} H_1(a_{c,t}, e_{c,t}) \\ H_2(a_{c,t}, e_{c,t}) \\ H_3(a_{c,t}, e_{c,t}) \\ H_4(a_{c,t}, e_{c,t}) \end{bmatrix}$$

Then, the FOA signal converted into a B-format is expressed as follows.

$$D_{t,f} = \begin{bmatrix} D_{t,f}^{(W)} \\ D_{t,f}^{(Y)} \\ D_{t,f}^{(Z)} \\ D_{t,f}^{(X)} \end{bmatrix} = \sum_{c=1}^{C} H_{c,t} S_{c,t,f}$$

Here, $D_{t,f}^{(W)}$, $D_{t,f}^{(Y)}$, $D_{t,f}^{(Z)}$ and $D_{t,f}^{(X)}$ represent elements that are the W component $D^{(W)}$, the Y component $D^{(Y)}$, the Z component $D^{(Z)}$ and the X component $D^{(X)}$ at a time t and a frequency f, respectively. Each of the superscripts "(W)," "(Y)," "(Z)" and "(X)" in $D_{t,f}^{(W)}$, $D_{t,f}^{(Y)}$, $D_{t,f}^{(Z)}$ and $D_{t,f}^{(X)}$ should be indicated just above the subscript "t, f," properly, but is indicated to the upper right of "t, f" because of limitations on notation of characters. Also, $S_{c,\,t,f}$ represents a signal of the time t and the frequency f produced from the c-th class sound source. Hereinafter, $D_{t,f}$ is referred to as an "observation signal vector."

In the new data augmentation technique, an angular rotation operation of an azimuth angle $a_{c,\,t}$ and/or an elevation angle $e_{c,\,t}$ of $D_{t,f}$ is performed to generate a signal that is different from $D_{t,f}$ in direction of arrival, $$D'_{t,f} = \begin{bmatrix} D'^{(W)}_{t,f} \\ D'^{(Y)}_{t,f} \\ D'^{(Z)}_{t,f} \\ D'^{(X)}_{t,f} \end{bmatrix} = \sum_{c=1}^{C} H'_{c,t,\theta,\phi} S_{c,t,f}.$$

Now, a transfer function vector $H'_{c,\,t,\,\theta,\,\varphi}$ of $D'_{t,f}$ obtained by the angular rotation operation of the azimuth angle $a_{c,\,t}$ and/or the elevation angle $e_{c,\,t}$ of $D_{t,f}$ is defined as follows.

$$H'_{c,t,\theta,\phi} = \begin{bmatrix} H_1(a_{c,t} + \theta, e_{c,t} + \phi) \\ H_2(a_{c,t} + \theta, e_{c,t} + \phi) \\ H_3(a_{c,t} + \theta, e_{c,t} + \phi) \\ H_4(a_{c,t} + \theta, e_{c,t} + \phi) \end{bmatrix}$$

Here, θ is an angle of rotation of the azimuth angle, and φ is an angle of rotation of the elevation angle. At least one of θ and φ is not 0. In other words, θ≠0 or φ≠0.

Now, each of transfer function vectors $H_{c,\,t}$ and $H'_{c,\,t,\,\theta,\,\varphi}$ clearly includes no distance attenuation term and represents angular rotation only. Therefore, $D'_{t,f}$ resulting from rotation of the azimuth angle $a_{c,\,t}$ and/or the elevation angle $e_{c,\,t}$ of $D_{t,f}$ can be obtained by multiplication of $D_{t,f}$ from the left side by a rotation matrix. Since $D_{t,f}^{(W)}$ is not changed by the angular rotation operation, only an operation of rotation of components $D_{t,f}^{(Y)}$, $D_{t,f}^{(Z)}$, $D_{t,f}^{(W)}$ in the observation signal vector $D_{t,f} = [D_{t,f}^{(W)}, D_{t,f}^{(Y)}, D_{t,f}^{(Z)}, D_{t,f}^{(X)}]^T$ will be described below. For the sake of convenience, multiplication of an observation signal vector with elements arranged in the order of $D_{t,f}^{(X)}$, $D_{t,f}^{(Y)}$ and $D_{t,f}^{(Z)}$, $$K_{t,f} = (D_{t,f}^{(X)}, D_{t,f}^{(Y)}, D_{t,f}^{(Z)})^T$$

by a rotation matrix will be considered. However, this is not intended to limit the present invention. Note that a' represents a transpose of a. As a simple method, a vector $$K'_{t,f} = (D'^{(X)}_{t,f}, D'^{(Y)}_{t,f}, D'^{(Z)}_{t,f})^T$$

only needs to be obtained by multiplication of $K_{t,f}$ from the left side by a rotation matrix $R_{\alpha,\,\beta,\,\gamma}$ in which α, β and γ are respective amounts of rotation around the vertical axis (roll), the right-and-left axis (pitch) and the front-and-rear axis (yaw), which are well known. An example of the rotation matrix $R_{\alpha,\,\beta,\,\gamma}$ is indicated below.

$$R_{\alpha,\beta,\gamma} = \begin{bmatrix} 1 & 0 & 0 \\ 0 & \cos\alpha & -\sin\alpha \\ 0 & \sin\alpha & \cos\alpha \end{bmatrix} \cdot \begin{bmatrix} \cos\beta & 0 & \sin\beta \\ 0 & 1 & 0 \\ -\sin\beta & 0 & \cos\beta \end{bmatrix} \cdot \begin{bmatrix} \cos\gamma & -\sin\gamma & 0 \\ \sin\gamma & \cos\gamma & 0 \\ 0 & 0 & 1 \end{bmatrix} \quad (1)$$

However, since only rotation of the azimuth angle and the elevation angle of the direction of arrival of the signal needs to be considered, a necessary angular rotation operation can be performed using a simpler algorithm. The new algorithm will be described below. First, a rotation matrix Rθ for performing a rotation operation of the observation signal vector $K_{t,f}$ in the azimuth angle direction can be described as below.

$$R_\theta = \begin{bmatrix} \cos\theta & -\sin\theta & 0 \\ \sin\theta & \cos\theta & 0 \\ 0 & 0 & 1 \end{bmatrix} \quad (2)$$

Figure 4A:
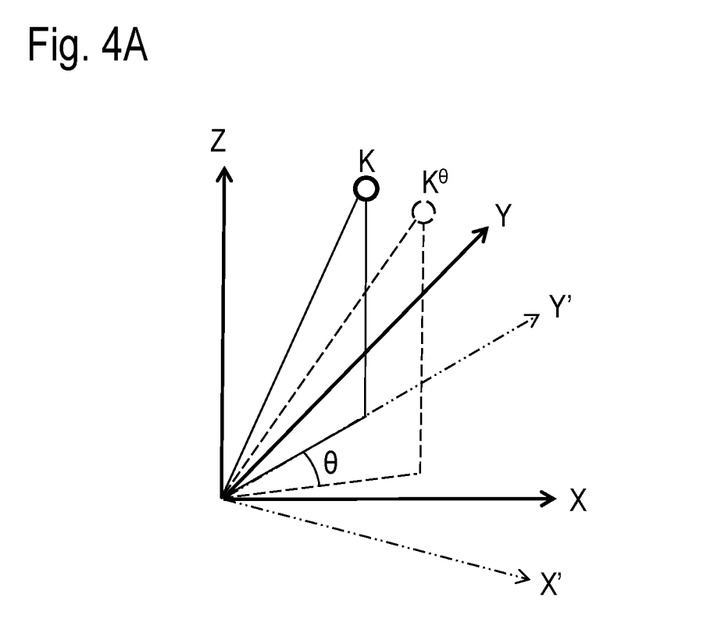
FIGS. 4A and 4B are diagrams each illustrating an angular rotation operation of an embodiment.
Figure 4B:
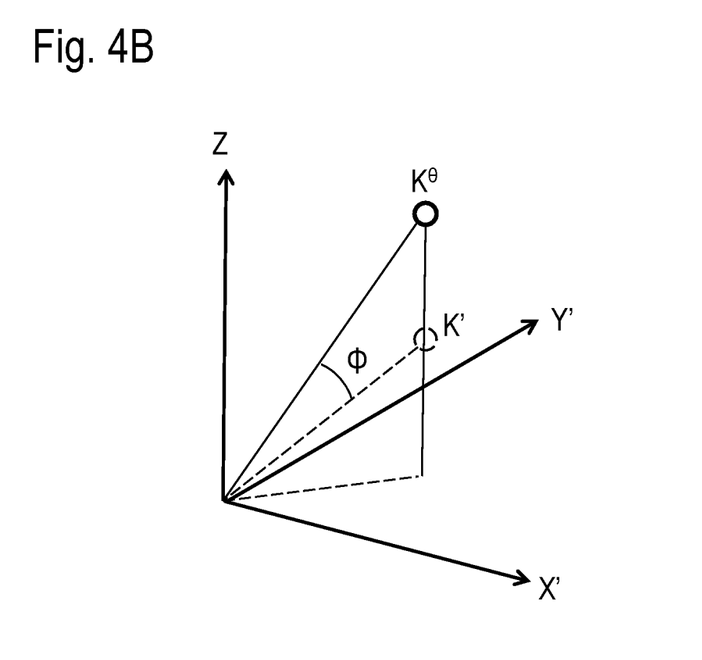

Here, it is set that a vector resulting from rotation of the observation signal vector $K_{t,f}$ by an angle θ in the azimuth angle direction alone, $K_{t,f}^\theta = R_\theta K_{t,f}$. Next, rotation of the vector $K_{t,f}^\theta$ by an angle φ in the elevation angle direction will be considered; however, there are two points that should be noted. First, since a range of value of the elevation angle of a sound source direction is [−π/2, π/2], it is necessary to select φ in such a manner that $e_{c,\,t}$+φ falls within that range. Also, rotation of the vector $K_{t,f}^\theta$ in the elevation angle direction is performed not on an initial Cartesian coordinate system for the observation signal vector $K_{t,\,f}$ but on a Cartesian coordinate system obtained by rotation of the initial Cartesian coordinate system by the angle θ in the azimuth angle direction alone. In other words, this angular rotation operation is an operation of further performing an operation of rotation of an azimuth angle-rotated signal obtained by performing an operation of rotation of a first observation signal by the angle θ in the azimuth angle direction on a first Cartesian coordinate system, by the angle φ in the elevation angle direction on a second Cartesian coordinate system obtained by performing an operation of rotation of the first Cartesian coordinate system by the angle θ in the azimuth angle direction. The first Cartesian coordinate system is defined by an X-axis, a Y-axis and a Z-axis that are orthogonal to one another in three-dimensional space (FIG. 4A: X-axis, Y-axis, Z-axis) and the first Cartesian coordinate system is defined by an X'-axis, a Y'-axis and the Z-axis that are orthogonal to one another in three-dimensional space (FIGS. 4A and 4B: X'-axis, Y'-axis, Z-axis). With attention to these points, according to Rodrigues' rotation formula, $K_{t,f}'$ is as follows.

$$K_{t,f}' = K_{t,f}^\theta \cdot \cos\varphi + \text{cross}(u, K_{t,f}^\theta) \sin\varphi + u \cdot \text{dot}(u, K_{t,f}^\theta)(1-\cos\varphi) \quad (3)$$

Here, $u=(\sin(a_{c,t}+\theta), \cos(a_{c,t}+\varphi), 0)^T$, cross (a, b) is a cross product (outer product) of a and b, dot(a, b) is a dot (inner product) of a and b and $a^T$ is a transpose of a.

Furthermore, limiting the azimuth angle and the elevation angle enables converting the observation signal vector $K_{t,f}$ into the vector $K_{t,f}'$ without performing an arithmetic operation between matrices. In other words, in Expression (3), the azimuth angle $a_{c,t}+\theta$ is limited only to $\pm a_{c,t}+\{-\pi/2, 0, \pi/2, \pi\}$, the elevation angle $e_{c,t}+\varphi$ is limited only to $\pm e_{c,t}$ and combinations of the azimuth angle $a_{c,t}+\theta$ and the elevation angle $e_{c,t}+\varphi$ are limited only to 16 patterns. In other words, $a_{c,t}+\theta$ is any of $a_{c,t}-\pi/2$, $a_{c,t}$, $a_{c,t}+\pi/2$, $a_{c,t}+\pi$, $-a_{c,t}-\pi/2$, $-a_{c,t}$, $-a_{c,t}+\pi/2$ and $-a_{c,t}+\pi$, and $e_{c,t}+\varphi$ is one of $e_{c,t}$ and $-e_{c,t}$. In this case, there is no need for an arithmetic operation between matrices in calculation of Expression (3) and $K_{t,f}'$ can be obtained by (I) negation and (II) channel swapping of elements of the observation signal vector $K_{t,f}$ alone. The below tables indicate relationships among combinations of the azimuth angle and the elevation angle, the elements $D_{t,f}^{(X)}$, $D_{t,f}^{(Y)}$, $D_{t,f}^{(Z)}$ of $K_{t,f}$, and the elements $D'_{t,f}^{(X)}$, $D'_{t,f}^{(Y)}$, $D'_{t,f}^{(Z)}$ of $K'_{t,f}$. For simplicity of description, the subscript "t, f" is omitted in these tables.

TABLE 1

| Elevation angle | Azimuth angle | | | |
|---|---|---|---|---|
| | $a_{c,t} - \pi/2$ | $a_{c,t}$ | $a_{c,t} + \pi/2$ | $a_{c,t} + \pi$ |
| $e_{c,t}$ | $D'^{(X)} = D^{(Y)}$ $D'^{(Y)} = -D^{(X)}$ $D'^{(Z)} = D^{(Z)}$ | $D'^{(X)} = D^{(X)}$ $D'^{(Y)} = D^{(Y)}$ $D'^{(Z)} = D^{(Z)}$ | $D'^{(X)} = -D^{(Y)}$ $D'^{(Y)} = D^{(X)}$ $D'^{(Z)} = D^{(Z)}$ | $D'^{(X)} = -D^{(X)}$ $D'^{(Y)} = D^{(Y)}$ $D'^{(Z)} = D^{(Z)}$ |
| $-e_{c,t}$ | $D'^{(X)} = D^{(Y)}$ $D'^{(Y)} = -D^{(X)}$ $D'^{(Z)} = -D^{(Z)}$ | $D'^{(X)} = D^{(X)}$ $D'^{(Y)} = D^{(Y)}$ $D'^{(Z)} = -D^{(Z)}$ | $D'^{(X)} = -D^{(Y)}$ $D'^{(Y)} = D^{(X)}$ $D'^{(Z)} = -D^{(Z)}$ | $D'^{(X)} = -D^{(X)}$ $D'^{(Y)} = -D^{(Y)}$ $D'^{(Z)} = -D^{(Z)}$ |

TABLE 2

| Elevation angle | Azimuth angle | | | |
|---|---|---|---|---|
| | $-a_{c,t} - \pi/2$ | $-a_{c,t}$ | $-a_{c,t} + \pi/2$ | $-a_{c,t} + \pi$ |
| $e_{c,t}$ | $D'^{(X)} = -D^{(Y)}$ $D'^{(Y)} = -D^{(X)}$ $D'^{(Z)} = D^{(Z)}$ | $D'^{(X)} = D^{(X)}$ $D'^{(Y)} = -D^{(Y)}$ $D'^{(Z)} = D^{(Z)}$ | $D'^{(X)} = D^{(Y)}$ $D'^{(Y)} = D^{(X)}$ $D'^{(Z)} = D^{(Z)}$ | $D'^{(X)} = -D^{(X)}$ $D'^{(Y)} = D^{(Y)}$ $D'^{(Z)} = D^{(Z)}$ |
| $-e_{c,t}$ | $D'^{(X)} = -D^{(Y)}$ $D'^{(Y)} = -D^{(X)}$ $D'^{(Z)} = -D^{(Z)}$ | $D'^{(X)} = D^{(X)}$ $D'^{(Y)} = -D^{(Y)}$ $D'^{(Z)} = -D^{(Z)}$ | $D'^{(X)} = D^{(Y)}$ $D'^{(Y)} = D^{(X)}$ $D'^{(Z)} = -D^{(Z)}$ | $D'^{(X)} = -D^{(X)}$ $D'^{(Y)} = D^{(Y)}$ $D'^{(Z)} = -D^{(Z)}$ |

Proof is omitted because the relationships are obvious from $H_1(a_{c,t}, e_{c,t})=1$, $H_2(a_{c,t}, e_{c,t})=\sqrt{3}*\sin(a_{c,t})*\cos(e_{c,t})$, $H_3(a_{c,t}, e_{c,t})=\sqrt{3}*\sin(e_{c,t})$, $H_4(a_{c,t}, e_{c,t})=\sqrt{3}*\cos(a_{c,t})*\cos(e_{c,t})$ stated above and theorems of trigonometric functions. For help in understanding the tables, calculation of $H_4(a_{c,t}+\theta, e_{c,t}+\varphi)$ taking a case where $a_{c,t}+\theta=a_{c,t}+\pi/2$ and $e_{c,t}+\varphi=-e_{c,t}$ as an example is as follows.

$$H_4(a_{c,t}+\theta, e_{c,t}+\phi) = H_4(a_{c,t}+\pi/2, -e_{c,t}) =$$
$$\sqrt{3}*\cos\left(a_{c,t}+\frac{\pi}{2}\right)*\cos(-e_{c,t}) = \sqrt{3}*(-\sin(a_{c,t}))*\cos(e_{c,t}) = -H_2(a_{ct}, e_{ct})$$

Therefore, $D'_{t,f}^{(X)} = -D_{t,f}^{(Y)}$.

First Embodiment

Next, a first embodiment of the present invention will be described.

<Configuration>

Figure 1:
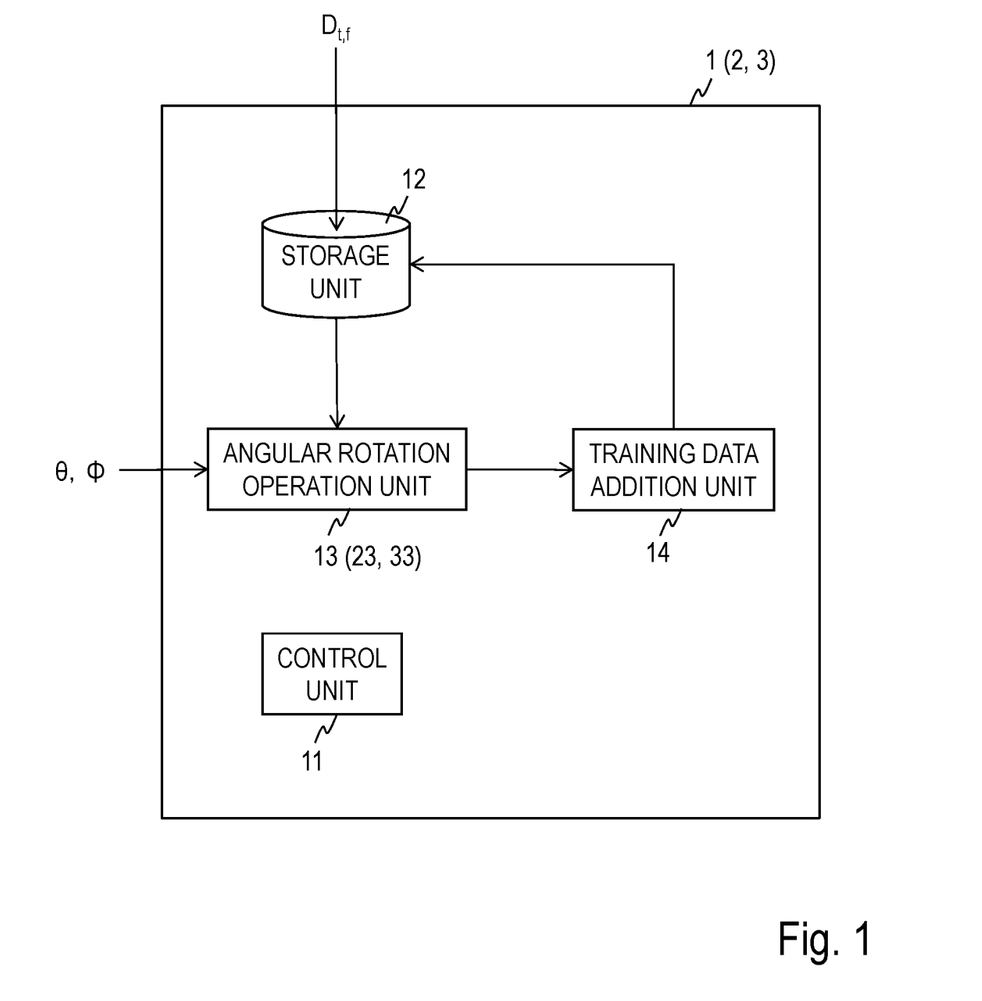
FIG. 1 is a block diagram illustrating a functional configuration of a training data augmentation device of an embodiment.

As illustrated in FIG. 1, a training data augmentation device 1 of the present embodiment includes a control unit 11, a storage unit 12, an angular rotation operation unit 13 and a training data addition unit 14. The training data augmentation device 1 performs respective processing steps under the control of the control unit 11.

Figure 2:
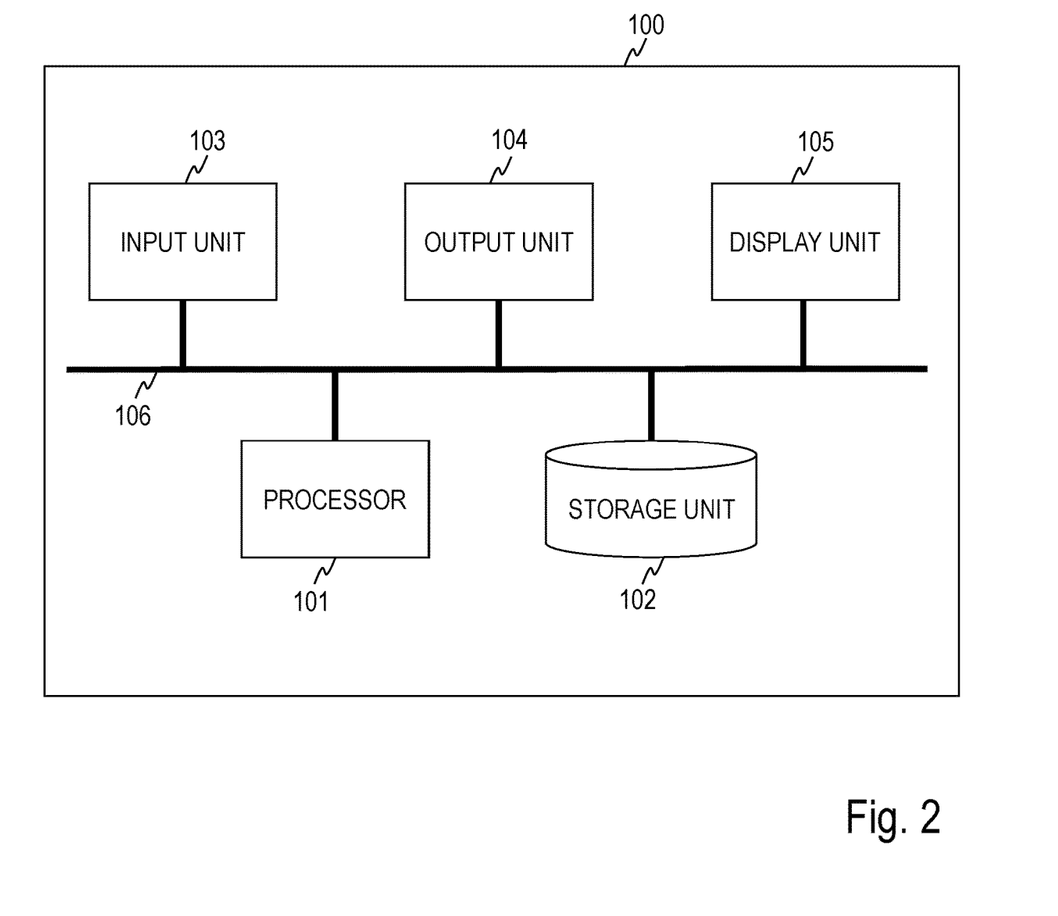
FIG. 2 is a block diagram illustrating a hardware configuration of a training data augmentation device of an embodiment.

The training data augmentation device 1 is a device configured by execution of a predetermined program by a general-purpose or dedicated computer 100, for example, such as illustrated in FIG. 2. The computer 100 illustrated in FIG. 2 includes a processor 101, a storage unit 102, an input unit 103, an output unit 104, a display unit 105 and a bus 106. However, where display of information by the display unit 105 is not necessary, the display unit 105 may be omitted.

The processor 101 is, for example, a CPU (central processing unit) or the like. The processor 101 includes, for example, a register that stores data, an arithmetic unit that performs arithmetic processing, and a controller that controls, e.g., arithmetic processing and data reading/writing. The processor 101 performs various arithmetic processing steps according to various programs read in the register. The processor 101 may include a single CPU only or may include a plurality of CPUs. The programs may be installed on the computer 100 or may be recorded in, e.g., the storage unit 102 in advance.

The input unit 103 includes, e.g., a touch panel, an input port, a keyboard, a mouse and/or a communication device, via which data is input, and the output unit 104 includes, e.g., an output port and/or a communication device, via which data is output. The storage unit 102 includes, e.g., a main storage device such as a RAM (random access memory), which is, e.g., an SRAM (static random access memory) or a DRAM (dynamic random access memory) and an auxiliary storage device such as a hard disk, an MO (magneto-optical disc) or a semiconductor memory. The bus 106 is communicably connected to the processor 101, the storage unit 102, the input unit 103, the output unit 104 and the display unit 105.

<Processing>

Next, a training data augmentation method of the present embodiment will be described.

As a premise, an observation signal vector $D_{t,f}$ based on signals produced from one or more sound sources and observed by a plurality of microphones (first observation signal corresponding to an incoming signal from a first direction) is stored in the storage unit 12. The observation signal vector $D_{t,f}$ is training data to be used for a model to learn and a set of such observation signal vectors is stored in the storage unit 12. An example of the model is a model that performs estimation based on transfer characteristics of an acoustic signal observed by a microphone, from an observation signal that is based on the acoustic signal. This model may be one that estimates a "type of the acoustic signal," a "time of the acoustic signal" and a "direction of arrival of the acoustic signal," may be one that estimates the "direction of arrival of the acoustic signal" only or may be one that estimates the "direction of arrival of the acoustic signal" and other information relating to the acoustic signal. The example of the model is a model based on a neural network, which has been described above, but may be a probabilistic model such as a hidden Markov model or a classifier such as an SVM (support vector machine). The observation signal vector $D_{t,f}$ may be supervised training data with a correct answer label or unsupervised training data with no correct answer label. The training data may directly be used in machine learning or feature values extracted from the training data may be used in machine learning.

Figure 3:
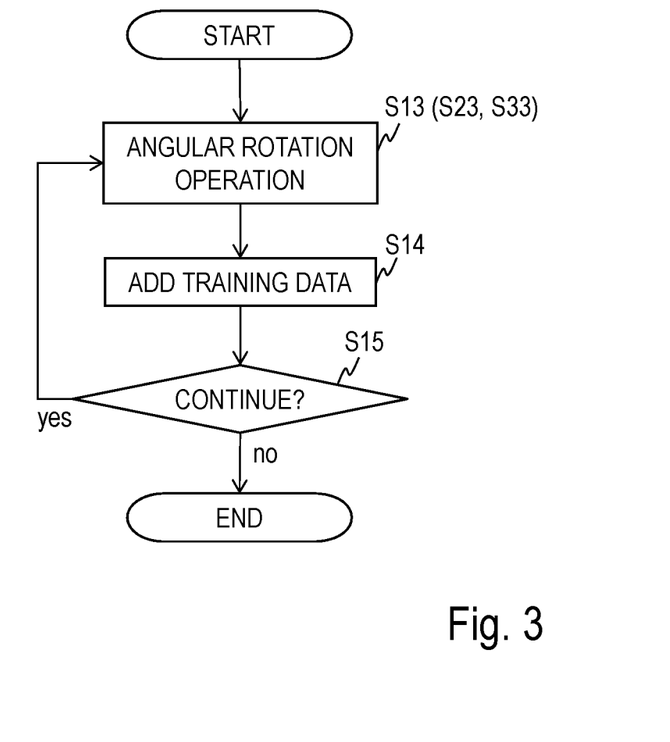
FIG. 3 is a flowchart for illustrating a training data augmentation method of an embodiment.

As illustrated in FIG. 3, in training data augmentation processing, first, the angular rotation operation unit 13 reads an observation signal vector $D_{t,f}$ (first observation signal corresponding to an incoming signal from a first direction) from the storage unit 12 and performs an angular rotation operation of the observation signal vector $D_{t,f}$ to obtain an observation signal vector $D'_{t,f}$ corresponding to a direction of arrival that is different from that of the observation signal vector $D_{t,f}$ (second observation signal corresponding to an incoming signal from a second direction that is different from the first direction), and outputs the observation signal vector $D'_{t,f}$. For example, the angular rotation operation unit 13 multiplies a vector including elements $D_{t,f}^{(X)}$, $D_{t,f}^{(Y)}$, $D_{t,f}^{(Z)}$, which are included in the input observation signal vector $D_{t,f}$, by a rotation matrix, and obtains a vector including resulting $D'_{t,f}^{(X)}$, $D'_{t,f}^{(Y)}$, and $D'_{t,f}^{(Z)}$, and $D_{t,f}^{(W)}$ as elements as the observation signal vector $D'_{t,f}$ and outputs the vector. For example, the angular rotation operation unit 13 multiplies an observation signal vector $K_{t,f}=(D_{t,f}^{(X)}, D_{t,f}^{(Y)}, D_{t,f}^{(Z)})^T$ included in the input observation signal vector $D_{t,f}$ from the left side by a rotation matrix to obtain a vector $K'_{t,f}=(D'_{t,f}^{(X)}, D'_{t,f}^{(Y)}, D'_{t,f}^{(Z)})^T$, and obtains a vector including vectors $K'_{t,f}$ and $D_{t,f}^{(W)}$ as elements, as the observation signal vector $D'_{t,f}$ and outputs the vector. As the rotation matrix, for example, the rotation matrix $R_{\alpha, \beta, \gamma}$ in Expression (1) above can be indicated as an example; however, this example does not limit the present invention.

As described above, the angular rotation operation by the angular rotation operation unit 13 is an operation of changing an azimuth angle $a_{c,t}$ of the observation signal vector $D_{t,f}$ to an azimuth angle $a_{c,t}+\theta$ and changing an elevation angle $e_{c,t}$ of the observation signal vector $D_{t,f}$ to an elevation angle $e_{c,t}+\varphi$. The angular rotation operation unit 13 may perform the angular rotation operation of the observation signal vector $D_{t,f}$ using an azimuth angle $\theta$ and an elevation angle $\varphi$ selected in advance or may perform the angular rotation operation of the observation signal vector $D_{t,f}$ using an azimuth angle $\theta$ and an elevation angle $\varphi$ input to the angular rotation operation unit 13.

It is desirable that an order of the elements $D'_{t,f}^{(X)}$, $D'_{t,f}^{(Y)}$, $D'_{t,f}^{(Z)}$ and $D_{t,f}^{(W)}$ included in the observation signal vector $D'_{t,f}$ corresponds to an order of elements included in the observation signal vector $D_{t,f}$. In other words, it is desirable that an order of a W component $D^{(W)}$, a Y component $D^{(Y)}$, a Z component $D^{(Z)}$ and a X component $D^{(X)}$ included in the observation signal vector $D_{t,f}$ be identical to an order of a W component $D^{(W)}$, a Y component $D^{(Y)}$, a Z component $D^{(Z)}$ and a X component $D^{(X)}$ included in the observation signal vector $D'_{t,f}$. However, if the elements included in the observation signal vector $D'_{t,f}$ can be reordered later, the order of the W component $D^{(W)}$, the Y component $D^{(Y)}$, the Z component $D^{(Z)}$ and the X component $D^{(X)}$ included in the observation signal vector $D_{t,f}$ may be different from the order of the W component $D^{(W)}$, the Y component $D^{(Y)}$, the Z component $D^{(Z)}$ and the X component $D^{(X)}$ included in the observation signal vector $D'_{t,f}$ (step S13).

The observation signal vector $D'_{t,f}$ obtained as described above is fed to the training data addition unit 14. The training data addition unit 14 stores the observation signal vector $D'_{t,f}$ (second observation signal) in the storage unit 12 to add the observation signal vector $D'_{t,f}$ to a set of training data. If the observation signal vector $D_{t,f}$ is supervised training data, the correct answer label of the observation signal vector $D_{t,f}$ and the azimuth angle $a_{c,t}+\theta$ and the elevation angle $e_{c,t}+\varphi$ (or the azimuth angle $\theta$ and the elevation angle $\varphi$) are further input to the training data addition unit 14. The training data addition unit 14 generates a correct answer label of the observation signal vector $D'_{t,f}$ using the correct answer label of the observation signal vector $D_{t,f}$ and the azimuth and elevation angles and provides the generated correct answer label to the observation signal vector $D'_{t,f}$. In other words, since the observation signal vector $D_{t,f}$ and the observation signal vector $D'_{t,f}$ are different from each other only in terms of information corresponding to the direction of arrival of the acoustic signal, a correct answer label in which only information corresponding to the direction of arrival of the acoustic signal in the correct answer label provided to the observation signal vector $D_{t,f}$ has been substituted with information corresponding to the azimuth angle $a_{c,t}+\theta$ and the elevation angle $e_{c,t}+\varphi$ is provided to the observation signal vector $D'_{t,f}$. In this case, the observation signal vector $D'_{t,f}$ provided with the correct answer label is stored in the storage unit 12 as training data. On the other hand, if the observation signal vector $D_{t,f}$ is unsupervised training data, the observation signal vector $D'_{t,f}$ is stored in the storage unit 12 as training data (step S14).

Next, the control unit 11 determines whether or not to continue the training data augmentation processing (step S15). A criterion of determination of whether or not to continue the augmentation processing is not limited. For example, it may be determined to continue the augmentation processing until a desired number of training data is added, it may be determined to continue the augmentation processing until an upper limit number of augmentable training data is reached or it may be determined to continue the augmentation processing until the model can ensure a desired estimation accuracy. If it is determined to continue the augmentation processing, the processing returns to step S13. If not, the processing ends.

Second Embodiment

The present embodiment is an alteration of the first embodiment. In an angular rotation operation of the present embodiment, an operation of further rotating an azimuth angle-rotated signal obtained by performing an operation of rotation of a first observation signal by an angle $\theta$ in an azimuth angle direction on a first Cartesian coordinate system (FIG. 4A: X-axis, Y-axis, Z-axis), by an angle $\varphi$ in an elevation angle direction on a second Cartesian coordinate system (FIGS. 4A and 4B: X'-axis, Y'-axis, Z-axis) obtained by performing an operation of rotation of the first Cartesian coordinate system by the angle $\theta$ in the azimuth angle direction is performed. Consequently, the amount of arithmetic operations necessary for angular rotation operation can be reduced. In the below, the description will be provided mainly on differences from the first embodiment and for matters that have already been described, reference numerals that are the same as those of the first embodiment are used and description of such matters will be simplified.

<Configuration>

As illustrated in FIG. 1, a training data augmentation device 2 of the present embodiment includes a control unit 11, a storage unit 12, an angular rotation operation unit 23 and a training data addition unit 14. The training data augmentation device 2 performs respective processing steps under the control of the control unit 11. The training data augmentation device 2 is also a device configured by execution of a predetermined program by a general-purpose or dedicated computer 100, for example, such as illustrated in FIG. 2.

<Processing>

The second embodiment is different from the first embodiment only in that step S13 described above is substituted with step S23 described below. The other matters are the same as those of the first embodiment, and thus, description thereof will be omitted.

In step S23, also, the angular rotation operation unit 23 reads an observation signal vector $D_{t,f}$ (first observation signal corresponding to an incoming signal from a first direction) from the storage unit 12, performs an angular rotation operation of the observation signal vector $D_{t,f}$ to obtain an observation signal vector $D'_{t,f}$ corresponding to a direction of arrival that is different from that of the observation signal vector $D_{t,f}$ (second observation signal corresponding to an incoming signal from a second direction that is different from the first direction), and outputs the observation signal vector $D'_{t,f}$. In the angular rotation operation of the present embodiment, an operation of further rotating an azimuth angle-rotated signal obtained by performing an operation of rotation of the observation signal vector $D_{t,f}$ by an angle θ in the azimuth angle direction on a first Cartesian coordinate system, by an angle φ in the elevation angle direction on a second Cartesian coordinate system obtained by performing an operation of rotation of the first Cartesian coordinate system by the angle θ in the azimuth angle direction is performed to obtain the observation signal vector $D'_{t,f}$. As described above, the observation signal vector $D_{t,f}$ (first observation signal) includes an X component $D^{(X)}$ based on a signal observed by a microphone (sensor) having directivity in the direction of the X-axis, a Y component $D^{(Y)}$ based on a signal observed by a microphone having directivity in the direction of the Y-axis and a Z component $D^{(Z)}$ based on a signal observed by a microphone having directivity in the direction of the Z-axis, as elements. The operation of rotation in the elevation angle direction on the second Cartesian coordinate system is performed in such a manner that an elevation angle $e_{c,t}$+φ of the observation signal vector $D'_{t,f}$ (second observation signal) becomes no less than −π/2 and no more than π/2 (that is, the operation is performed within the range of value of the elevation angle). For example, the observation signal vector $D_{t,f}$ (first observation signal) is based on a signal observed by first-order Ambisonics, the operation of rotation in the azimuth angle direction is an operation of rotation of the azimuth angle from $a_{c,t}$ to $a_{c,t}$+θ, and the operation of rotation in the elevation angle direction is an operation of rotation of the elevation angle from $e_{c,t}$ to $e_{c,t}$+(P. The observation signal vector $D_{t,f}$ includes an observation signal vector $K_{t,f}=(D_{t,f}^{(X)}, D_{t,f}^{(Y)}, D_{t,f}^{(Z)})^T$ and the azimuth angle-rotated signal includes $K_{t,f}^{\theta}=R_\theta K_{t,f}$ in which $$R_\theta = \begin{bmatrix} \cos\theta & -\sin\theta & 0 \\ \sin\theta & \cos\theta & 0 \\ 0 & 0 & 1 \end{bmatrix}.$$

The angular rotation operation unit 23 obtains $K_{t,f}'=(D'_{t,f}^{(X)}, D'_{t,f}^{(Y)}, D'_{t,f}^{(Z)})^T$ according to Expression (3) from the observation signal vector $K_{t,f}$ extracted from the observation signal vector $D_{t,f}$, and obtains a vector including elements $D'_{t,f}^{(X)}, D'_{t,f}^{(Y)}, D'_{t,f}^{(Z)}$ of the vector $K'_{t,f}$ and $D_{t,f}^{(W)}$ as elements, as the observation signal vector $D'_{t,f}$ and outputs the vector. The rest of the processing is the same as that of the first embodiment.

Third Embodiment

The present embodiment is an alteration of the second embodiment. In the present embodiment, an elevation angle $a_{c,t}$+θ of an observation signal vector $D'_{t,f}$ is limited to any of $a_{c,t}$−π/2, $a_{c,t}$, $a_{c,t}$+π/2, $a_{c,t}$+π, −$a_{c,t}$−π/2, −$a_{c,t}$, −$a_{c,t}$+π/2 and −$a_{c,t}$+π and an azimuth angle $e_{c,t}$+φ of the observation signal vector $D'_{t,f}$ is limited to one of $e_{c,t}$ and −$e_{c,t}$.

<Configuration>

As illustrated in FIG. 1, a training data augmentation device 3 of the present embodiment includes a control unit 11, a storage unit 12, an angular rotation operation unit 33 and a training data addition unit 14. The training data augmentation device 2 performs respective processing steps under the control of the control unit 11. The training data augmentation device 3 is also a device configured by execution of a predetermined program by a general-purpose or dedicated computer 100, for example, such as illustrated in FIG. 2.

<Processing>

The second embodiment is different from the first embodiment only in that step S13 described above is substituted with step S33 described below. The other matters are the same as those of the first embodiment, and thus, description thereof will be omitted. In step S33, the angular rotation operation unit 33 performs conversion of $D_{t,f}^{(X)}, D_{t,f}^{(Y)}, D_{t,f}^{(Z)}$ extracted from an observation signal vector $D_{t,f}$ read from the storage unit 12, according to a combination of an elevation angle $a_{c,t}$+θ and an azimuth angle $e_{c,t}$+φ such as indicated in [Table 1] or [Table 2], to obtain $D'_{t,f}^{(X)}, D'_{t,f}^{(Y)}, D'_{t,f}^{(Z)}$. [Table 1] and [Table 2] may be set in the angular rotation operation unit 33 in advance or may be provided from the outside of the angular rotation operation unit 33. The angular rotation operation unit 33 obtains a vector including $D'_{t,f}^{(X)}, D'_{t,f}^{(Y)}, D'_{t,f}^{(Z)}$ and $D_{t,f}^{(W)}$ as elements, as an observation signal vector $D'_{t,f}$, and outputs the vector. The rest of processing is the same as that of the first embodiment.

[Test Result]

A result of a test will be indicated below. Here, a result of a test in which an observation signal vector $D'_{t,f}$ resulting from data augmentation according to the method of the third embodiment was applied to DCASE2019 Task 3 "Sound Event Localization and Detection" stated in Non-Patent Literature 1 is indicated. A data set used as an observation signal vector $D_{t,f}$ this time was TAU2019 Spatial Sound Events 2019 stated in Reference Literature 3. The present data set includes 400 one-minute four-channel audio data recorded in an FOA signal format. These data were those obtained by combining non-reverberation sound sources classified into 11 classes, based on 504 combinations of a direction of arrival and a distance, using five types of room impulse responses. Using a log-melspectrogram obtained from the observation signal vector $D'_{t,f}$ obtained by data augmentation of the observation signal vector $D_{t,f}$ according to the method of the third embodiment and GCC-PHAT (for example, Reference Literature 4), machine learning for a model that performs estimation of, e.g., a direction of arrival of an acoustic signal based on a neural network was performed. A result of comparison in DOA error (for example, Non-Patent Literature 1) between a case where estimation of a direction of arrival of an acoustic signal was performed using the model thus obtained (present technique) and a case where estimation of a direction of arrival of an acoustic signal was performed by the technique of Reference Literature 1 without such data augmentation being performed (conventional technique) is indicated below. A DOA error is an index of an error of a direction of arrival of an acoustic signal relative to a true direction of arrival of the acoustic signal.

DOA Error
Conventional technique: 9.85°
Present technique: 7.12°

As indicated above, in the case of the present technique, the DOA error decreased by 2.73° in comparison with the conventional technique. This indicates that the present technique is effective for data augmentation of training data.

Reference Literature 4: C. H. Knapp and G. Carter, "The generalized correlation method for estimation of time delay," IEEE Transactions on Acoustics, Speech, and Signal Processing (Volume: 24, Issue: 4, August 1976), pp. 320-327.

Reference Literature 5: K. He, X. Zhang, S. Ren, and J. Sun, "Deep residual learning for image recognition," Microsoft Research.

[Other Alterations and Like]

The present invention is not limited to the above-described embodiments. For example, in the above-described embodiments, an FOA signal converted into a B-format is used as a first observation signal, which, however, does not limit the present invention. Another signal that is based on signals obtained through observation of an acoustic signal by a plurality of microphones may be used as a first observation signal. Also, in the above-described embodiments, an incoming signal is an acoustic signal and a first observation signal and a second observation signal are ones that are based on signals obtained through observation of the acoustic signal. However, an incoming signal is a chronological signal other than an acoustic signal (for example, electromagnetic waves, seismic waves or ultrasound waves) and sensors capable of observing the chronological signal may be used instead of the microphones. In other words, a first observation signal and a second observation signal may be ones that are based on signals obtained through observation of a chronological signal other than an acoustic signal by sensors. For example, a signal obtained by conversion of signals into a time-frequency domain, the signals being obtained through observation of a chronological signal other than an acoustic signal by sensors, may be used as a first observation signal. Also, in the above-described embodiments, a first observation signal and a second observation signal are signals in a time-frequency domain but may be signals in a time domain. For example, a signal obtained through observation of a chronological signal by sensors may be used as a first observation signal.

Also, although in the above-described embodiments, a first observation signal and a second observation signal each contain a W component $D^{(W)}$ based on a signal observed by an omnidirectional microphone, a first observation signal and a second observation signal may each contain no W component $D^{(W)}$. Although in the above-described embodiments, a W component $D^{(W)}$ of a first observation signal is used as a W component $D^{(W)}$ of a second observation signal, a function value or another value of a W component $D^{(W)}$ of a first observation signal may be used as a W component $D^{(W)}$ of a second observation signal.

Also, various processing steps described above are not only performed chronologically according to the description but also may be parallelly or individually performed depending on processing performance of a device that performs the processing steps or as necessary. In addition, it should be understood that appropriate changes are possible without departing from the spirit of the present invention.

Also, where the above-described configuration is implemented by a computer, the content of processing by a function that each device should have is described as a program. Then, the processing function is implemented on the computer by execution of the program by the computer. The program with the processing content described therein can be recorded in a computer-readable recording medium in advance. An example of the computer-readable recording medium includes a non-transitory recording medium. Examples of such a recording medium include, e.g., a magnetic recording device, an optical disk, a magneto-optical recording medium and a semiconductor memory.

Also, the program is distributed, for example, by, e.g., sale, transfer or lease of a removable recording medium such as a DVD or a CD-ROM with the program recorded therein. Furthermore, this program may be distributed by storing the program in a storage device of a server computer in advance and transferring the program from the server computer to another computer via a network.

The computer that executes such a program, for example, first stores the program recorded in a removable recording medium or transferred from the server computer in its own storage device. Then, at the time of performing processing, the computer reads the program stored in its own storage device and performs processing according to the read program. Also, as another form of execution of the program, the computer may read the program directly from the removable recording medium and perform processing according to the program, and furthermore, it is possible that each time the program is transferred to the computer from the server computer, the computer sequentially performs processing according to the received program. Also, the above-described processing may be performed by what is called an ASP (application service provider)-type service in which a processing function is implemented only by an instruction to execute the program and acquisition of a result of the execution without transfer of the program from the server computer to the computer. Also, the programs in the present form include those that are information provided for processing by a computer and equivalent to programs (e.g., data that is not a direct instruction to a computer but has a nature of defining processing by the computer).

Also, in this form, the device is configured by execution of a predetermined program on a computer; however, at least a part of the contents of the processing may be implemented by hardware.

INDUSTRIAL APPLICABILITY

The present invention is usable, for example, in a field in which from an acoustic signal observed by a microphone, a "type of an acoustic signal," a "time of the acoustic signal" and a "direction of arrival of the acoustic signal" are estimated. For example, the present invention is usable as a basic technique for estimating, e.g., from which direction an emergency vehicle is coming in an autonomous driving vehicle.

REFERENCE SIGNS LIST 1 to 3 training data augmentation device
13 to 33 angular rotation operation unit
14 training data addition unit

The invention claimed is:

1. A training data augmentation device comprising processing circuitry configured to:
   receive an input of a first observation signal corresponding to an incoming signal from a first direction and performs an angular rotation operation of the first observation signal to obtain a second observation signal corresponding to an incoming signal from a second direction that is different from the first direction; and
   add the second observation signal to a set of training data.

2. The training data augmentation device according to claim 1, wherein the angular rotation operation is an operation of further performing an operation of rotation of an azimuth angle-rotated signal obtained by performing an operation of rotation of the first observation signal in an azimuth angle direction on a first Cartesian coordinate system, in an elevation angle direction on a second Cartesian coordinate system obtained by performing an operation of rotation of the first Cartesian coordinate system in the azimuth angle direction.

3. The training data augmentation device according to claim 2, wherein:
   the first Cartesian coordinate system is defined by an X-axis, a Y-axis and a Z-axis that are orthogonal to one another in three-dimensional space;
   the first observation signal includes an X component $D^{(X)}$ based on a signal observed by a sensor having directivity in a direction of the X-axis, a Y component $D^{(Y)}$ based on a signal observed by a sensor having directivity in a direction of the Y-axis and a Z component $D^{(Z)}$ based on a signal observed by a sensor having directivity in a direction of the Z-axis, as elements; and
   the operation of performing an operation of rotation in the elevation angle direction on the second Cartesian coordinate system is performed in such a manner that an elevation angle of the second observation signal becomes no less than $-\pi/2$ and no more than $\pi/2$.

4. The training data augmentation device according to claim 3, wherein:
   the first observation signal is based on a signal observed by first-order Ambisonics;
   the operation of rotation in the azimuth angle direction is an operation of rotation of an azimuth angle from $a_{c,t}$ to $a_{c,t}+\theta$;
   the operation of rotation in the elevation angle direction is an operation of rotation of an elevation angle from $e_{c,t}$ to $e_{c,t}+\varphi$;
   the first observation signal includes $K_{t,f}=(D_{t,f}^{(X)}, D_{t,f}^{(Y)}, D_{t,f}^{(Z)})^T$;
   the azimuth angle-rotated signal includes $K_{t,f}^{\theta}=R_\theta K_{t,f}$ in which $$R_\theta = \begin{bmatrix} \cos\theta & -\sin\theta & 0 \\ \sin\theta & \cos\theta & 0 \\ 0 & 0 & 1 \end{bmatrix};$$

and
the second observation signal includes $K_{t,f}^{\theta} \cdot \cos\varphi + \text{cross}(u, K_{t,f}^{\theta})\sin\varphi + u \cdot \text{dot}(u, K_{t,f}^{\theta})(1-\cos\varphi)$ in which $u=(\sin(a_{c,t}+\theta), \cos(a_{c,t}+\varphi), 0)^T$, cross (a, b) is an outer product of a and b, dot(a, b) is an inner product of a and b and $a^T$ is a transpose of a.

5. The training data augmentation device according to claim 4, wherein:
   $a_{c,t}+\theta$ is any of $a_{c,t}-\pi/2$, $a_{c,t}$, $a_{c,t}+\pi/2$, $a_{c,t}+\pi$, $-a_{c,t}-\pi/2$, $-a_{c,t}$, $-a_{c,t}+\pi/2$ and $-a_{c,t}+\pi$; and $e_{c,t}+\varphi$ is one of $e_{c,t}$ and $-e_{c,t}$.

6. The training data augmentation device according to claim 1, wherein the incoming signal is an acoustic signal.

7. A training data augmentation method comprising:
   an angular rotation operation step of receiving an input of a first observation signal corresponding to an incoming signal from a first direction and performing an angular rotation operation of the first observation signal to obtain a second observation signal corresponding to an incoming signal from a second direction that is different from the first direction; and
   a training data addition step of adding the second observation signal to a set of training data.

8. A non-transitory computer-readable recording medium storing a program for making a computer function as the training data augmentation device according to claim 1.

* * * * *